A. W. GATTIE.
SPRING SUSPENSION.
APPLICATION FILED FEB. 3, 1922.

1,426,178.

Patented Aug. 15, 1922.
3 SHEETS—SHEET 1.

Witnesses:
L. C. Badeau
H. D. Penney

Inventor:
Alfred Warwick Gattie,
By his Att'y, F. W. Richards

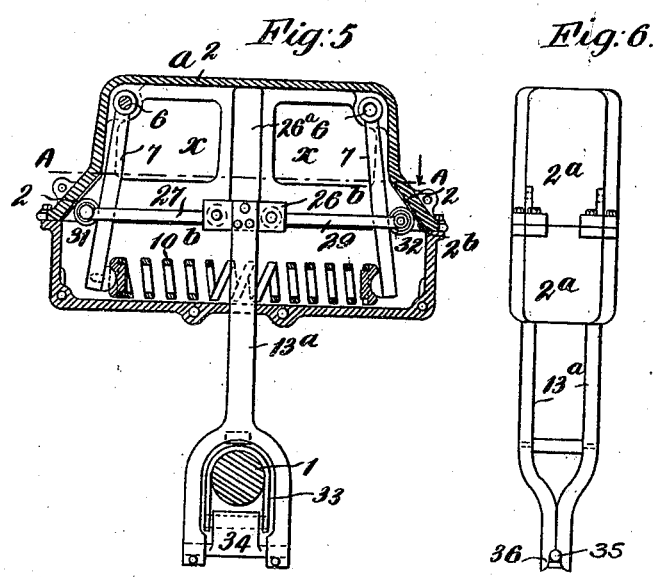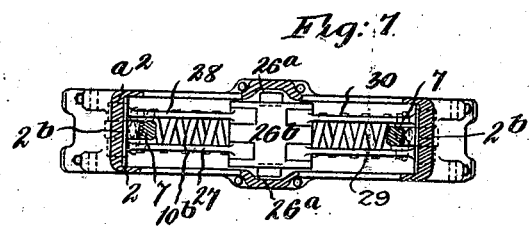

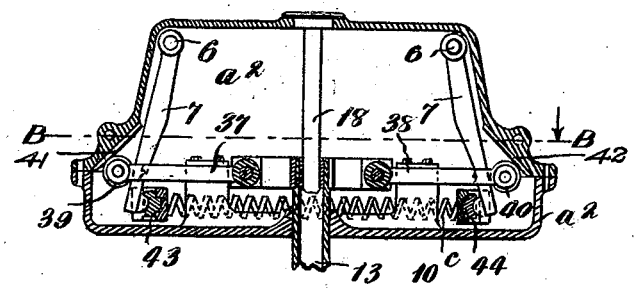
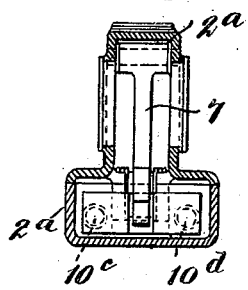 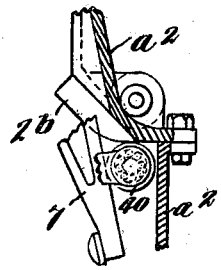
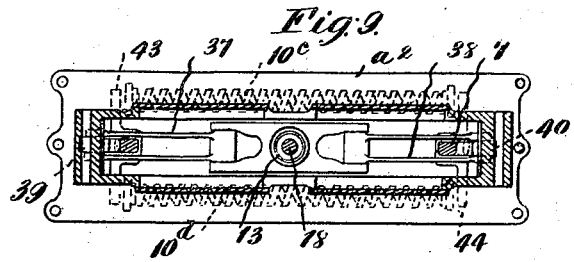

UNITED STATES PATENT OFFICE.

ALFRED WARWICK GATTIE, OF LONDON, ENGLAND.

SPRING SUSPENSION.

1,426,178.  Specification of Letters Patent.  Patented Aug. 15, 1922.

Application filed February 3, 1922. Serial No. 533,777.

*To all whom it may concern:*

Be it known that I, ALFRED WARWICK GATTIE, a subject of the King of Great Britain, residing in London, England, have invented a certain new and useful Improvement in Spring Suspension, of which the following is a specification.

This invention relates to spring suspensions for motor and other vehicles and it has for its object to provide a suspension in which a maximum of resiliency is secured with a minimum of stress upon the spring or springs as the case may be.

Various forms of spring suspensions and shock absorbing devices have been proposed in which toggle or other levers have been employed the said toggle or other levers being so arranged, however, that the leverage exerted by the toggle or other levers upon the spring is directly proportional to the weight they are called upon to support. In other words as the weight increases the leverage of the levers increase with a proportionately increased effort imposed upon the spring.

As primarily distinguished from the foregoing according to this invention the suspension is so constructed and arranged that with every increase or decrease in the load carried there is automatically caused thereby a decrease or increase in the leverage exercising a compressive action on the spring. That is to say when the load is at its minimum the leverage exercised is at its maximum and with every increase of load this leverage is diminished until at the maximum load the leverage has disappeared or become a minus quantity. This effect is automatically produced by the movement of the fulcra of the levers caused by the varying weight of the load.

In order that the invention may be the better understood drawings are appended in which:—

Fig. 5 is a side view partly in section showing a further modification, Fig. 6 is an end view of Fig. 5, Fig. 7 is a sectional plan view on line A A of Fig. 5, looking in direction of the arrow.

Fig. 8 is a side view partly in section showing a further modification,

Fig. 9 is a sectional plan view on line B B of Fig. 8, looking in direction of the arrow.

Fig. 10 is an end view partly in section,

Fig. 11 is a view showing more clearly a detail of construction.

Figures 1, 2:
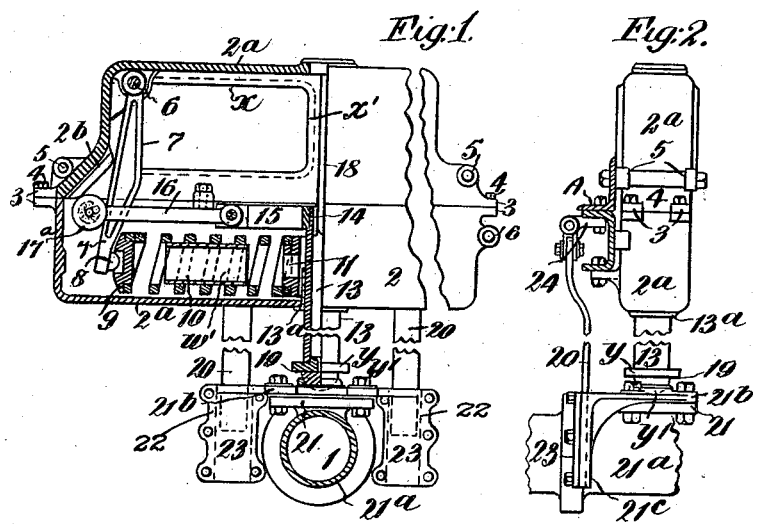
Fig. 1 is a side view of one form of the invention partly in section.
Fig. 2 is an end view.

Referring to the accompanying drawings, in Figs. 1 to 4, 1 indicates the axle of the vehicle. $2^a$ indicates an outer case formed in two parts bolted or secured together by means of lugs 3 upon the exterior of the case and through which lugs pass bolts 4. The case is secured to the frame of the vehicle indicated by A by means of lugs 5 through which lugs bolts are passed securing said case to said frame. Pivotally mounted at 6, one at each end of case $2^a$, are arms such as 7 which arms at the lower ends are connected by ball and socket connections, indicated generally by 8, to circular plates such as 9 and which plates have upon their inner faces circular projections designed to engage the centres of the spiral springs 10, $10^a$. The springs 10, $10^a$ at the inner ends engage suitable projections formed upon the ends of a bridge piece or plate 11 perforated at 12 for the passage of the rod or plunger 13. Secured to the plunger 13 is a collar 14 from which project at diametrically opposite points bifurcated arms or extensions such as 15 in the outer ends of which are pivotally mounted links such as 16 which at their outer ends are bifurcated to permit the passage of the arms 7. Passing through the outer ends of the links 16 are pins upon which are mounted rollers such as 17 which rollers contact with the outer edges of the links 16, other rollers $17^a$ upon the pins contact with the inclined surfaces such as $2^b$ formed in the case $2^a$. Preferably the surface $2^b$ is of the outline shown in Fig. 11.

Openings $x$, formed in the sides of the case $2^a$, permit access to the interior of said case said openings having covering plates $x^1$ shown by broken lines removably secured thereover. The plunger 13 is formed hollow being guided in the case by means of the flanged sleeve $13^a$ upon the bottom of the case $2^a$ and the rod 18, secured to the top of said case, and which rod engages the bore of plunger 13. By means of the construction just described it results that a blow received by the wheel is not transmitted to the vehicle. This result is secured in the following way.

For example, the blow delivered in a vertical plane is received by the plunger which transmits a tensile strain to the toggle levers, the ends of which carry the rollers 17a. These rollers are drawn upwards and inwards over two pairs of opposing inclined planes, on each of which a gradually increased pressure is induced while one of the inclined planes yields in the required degree and compresses, from its two ends, a spiral or other spring lying in a horizontal plane.

It will be seen that the blow received is split into two halves and converted into two balanced tensile strains the rollers being draw inwards over the surfaces of the inclined planes. The blow is thus converted into a rolling action.

In the arrangement just described the case is carried by the frame of the vehicle the plunger being connected to the axle.

It is of great importance that the plunger shall be subjected as little as possible to side strain or any strain in the horizontal plane, and in order to secure this the following scheme of attachment is suggested.

Figure 3:
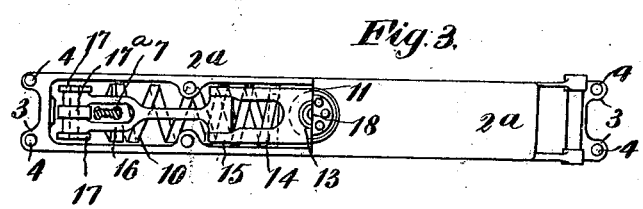
Fig. 3 is a part sectional plan.
Figure 4:
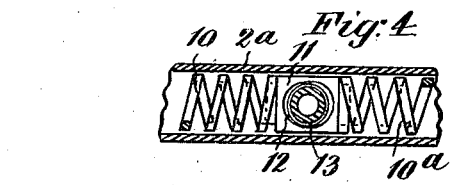
Fig. 4 is a sectional view showing more clearly certain details of the arrangement shown in Figs. 1, 2 and 3.

The bottom end of the plunger, Figs. 1 to 3, is fitted with a foot or plinth $y$, the undersurface of this foot or plinth is flat and polished and is lubricated through a gland, not shown, from the interior of the plunger. This foot or plinth $y$ rests upon a hemisphere of suitable metal 19 the flat side of the hemisphere being upwards. The hemisphere rests in a lubricated basin $y^1$, which is fixed to the top side of the axle.

It will be seen that the hemisphere 19 is free to move in any direction inside the basin and in any horizontal direction in relation to the foot of the plunger. This latter horizontal movement is limited in the following way. Axle guides 20 are attached to the frame A of the car. These axle guides act as torque rods and allow a free vertical movement to the axle. The axle guides are composed of steel strips hinged to the frame A of the lorry and said strips pass through slots cut in a suitable fixture to the axles as shown in Figs. 1 and 2.

In the figures just referred to a bracket 21 is mounted in any suitable manner upon the axle, for example by means of the annular body or sleeve 21a having a flange 21b. The bracket 21 is bolted to flange 21b having depending members 21c provided upon their outer faces with recesses 22 of greater width than the guides for the strips 20 of rectangular cross-sectional outline. Cover plates 23 bolted to the front of the bracket, serve to hold the strips 20 slidably within the recesses 22 and at the same time prevent their lateral displacement. The bracket 21 supports the hemisphere 19 upon which the plunger 13 bears as already described. Bolted to the side frame of the vehicle are plates 24 pivotally connected to the upper ends of the rods 20.

When required additional torque rods may be used to keep the axle in position and resist all incidental strains.

Whilst, as just above described, two springs 10, 10a arranged in axial alignment, are employed a single spring may be substituted for said springs. A form of construction having a single spring is employed in the arrangement shown in Figs. 5, 6 and 7.

In this case a substantially similar arrangement of parts is employed the plunger or rod, indicated by 13a, however, being bifurcated and its components slidably housed in recesses or channels 26a, 26a formed in the sides of the lower portion of the case 2a. Secured between the upper ends of the side members of the plunger is a block 26b slidably fitted between the outer surfaces of the cheeks of the channels 26a, 26a. The block is slotted and pivotally mounted in said slots are the ends of links 27, 28, 29, 30 the outer ends of which carry rollers 31, 32, running upon inclined surfaces in the manner already described in connection with Figs. 1 to 4. The spring indicated by 10b passes between the bifurcated sides of the plunger and is provided at its ends with plates with which engage the ends of levers in the manner already shown and described. The connection to the wheel axle 1 may in this case be effected by means of the inverted U-shaped body 33 partly encircling the said axle as shown in the drawings and connected to the cranked body 34, the pins 35 of which engage the slots 36 formed in the lower ends of the plunger.

Where it is desired to provide for very heavy loads instead of one spring, such as 10b, two springs 10c, 10d may be employed arranged as shown in Figs 8, 9, and 10. In this case double levers 37, 38 are provided having at their outer ends pins supporting rollers 39, 40 which rollers engage the outer surfaces of the links 41, 42 pivotally mounted within the upper part of the case.

The lower portion of the case is of greater width than the upper part as more clearly shown in Figs. 9 and 10.

43, 44 indicate bridge pieces the centres of each of which is engaged by the lower end of the links 41, 42, the ends of said bridge pieces being engaged by the ends of the springs 10c, 10d disposed one on each side of the case as clearly shown in Figs. 9 and 10.

In order to avoid longitudinal flexure of the springs I may provide a cylindrical body such as $w^1$, Fig. 1, which is placed inside the spring or springs as the case may be as shown.

The operation of the parts in each of the forms of the invention illustrated is substantially as described with reference to Figs. 1 to 4.

Obviously instead of having one of the bodies contacting with the rollers rigid with the case this body may be a pivotally mounted body a spring acting upon it to hold it in contact with the roller and to oppose the outward movement of said body under load variations.

Although the invention is described as being for use upon vehicles it may obviously be employed generally as a vibration or shock absorbing device.

With a suspension or shock absorbing device according to this invention not only is a maximum of resiliency obtained with a minimum of strain upon the parts but as there is no positive connection between the parts attached to the respective bodies, the chassis and the wheel axle for example, the one is floatingly supported by the other and shocks and jars are rapidly absorbed and their transmission from one of said bodies to the other prevented.

I claim:

1. In a suspension and shock absorbing device, a case secured to the object to be suspended; an axle; the case being interposed between said axle and object; a plunger operatively connected to said axle and movable in said case; lever means operatively connected to said case; spring means appurtenant to said lever means and arranged for cooperating therewith for compression thereby; and operatively disposed members carried by said plungers comprising links cooperating with said lever means; the ends of the links being provided with means for engaging inclined surfaces appurtenant to said case.

2. In a suspension and shock absorbing device, a case secured to the object to be suspended; an axle; the case being interposed between said axle and object; a plunger movable in said case; lever arms pivotally connected to said case; spring means appurtenant to said lever arms and arranged for cooperating therewith for compression thereby; oppositely disposed members carried by said plunger comprising links cooperating said lever arms; the ends of the links being provided with means for engaging inclined surfaces appurtenant to said case; and means cooperative between one end of said plunger and said axle for operatively connecting the plunger and axle.

3. In a suspension and shock absorbing device, a case secured to the frame of a vehicle; an axle; the case being interposed between said axle and frame; a plunger operatively connected to said axle and movable in said case; lever arms pivotally connected to said case; spring means supported and arranged in said case for cooperating with the lever arms for compression thereby; and oppositely disposed members carried by the plunger comprising links cooperating with said lever arms; the ends of the links being provided with means for engaging inclined surfaces appurtenant to said case.

4. In a suspension and shock absorbing device, a case secured to the frame of a vehicle; an axle; the case being interposed between said axle and frame; a plunger operatively connected to said axle and movable in said case; lever arms pivotally connected to said case; spring means supported and arranged in the case for cooperating with the lever arms for compression thereby; and oppositely disposed members carried by the plunger comprising links, the lever arms passing through the open portions of said links; the ends of the links being provided with roller means engaging inclined surfaces appurtenant to said case.

5. In a suspension and shock absorbing device, a case secured to the frame of a vehicle; an axle; the case being interposed between said axle and frame; a plunger movable in said case; lever arms pivotally connected to said case; spring means supported and arranged in the case for cooperating with said lever arms for compression thereby; oppositely disposed members carried by the plunger comprising links, the lever arms passing through the open portions of said links; the ends of the links being provided with roller means engaging inclined surfaces appurtenant to said case; and means secured to the axle comprising a universally pivotally supported member engaging the lower end of said plunger for operatively connecting the plunger and axle.

6. In a suspension and shock absorbing device, a case secured to the frame of a vehicle; an axle; the case being interposed between said axle and frame; a plunger movable in said case; lever arms pivotally connected to said case; spring means supported and arranged in the case for cooperating with said lever arms for compression thereby; oppositely disposed members carried by the plunger cooperating with said lever arms and provided with ends movably engaging inclined surfaces appurtenant to the case; means secured to the axle comprising means cooperating with the lower end of the plunger for operatively connecting the plunger and axle; and means for limiting horizontal movement of said cooperating means and permitting vertical movement of the axle.

7. In a suspension and shock absorbing device, a case secured to the frame of a vehicle; an axle; the case being interposed between said axle and frame; a plunger movable in said case having a plinth at its lower end; lever arms pivotally connected to said case; spring means supported and arranged in the case for cooperating with said lever arms for compression thereby; oppositely disposed members carried by the plunger cooperating with said lever arms and provided with ends movably engaging inclined surfaces appurtenant to said case; a bracket secured to the axle having a hemispherical recess in its upper portion and having dependent plates with slideway recesses therein; a hemispherical member in said hemispherical recess, the upper face of said member engaging said plinth of the plunger; and axle guides slidably engaging at their lower ends in said slideway recesses and pivotally connected at their upper ends to the frame of the vehicle.

8. In a suspension and shock absorbing device, toggle means; a member carried by said toggle means and movable between two opposing surfaces; lever means constituting one of said opposed surfaces; and spring means appurtenant to the lever means for pressing one or both of said surfaces onto said member.

9. In a suspension and shock absorbing device, toggle means; a roller member carried by said toggle means and movable between two opposing surfaces; lever means constituting one of said opposed surfaces; and spring means appurtenant to the lever means for pressing one or both of said surfaces onto said member.

In testimony whereof I have hereunto set my hand in the presence of two witnesses.

ALFRED WARWICK GATTIE.

Witnesses:
E. T. TRUSCOTT,
M. E. SCOBLE.